(12) United States Patent
Zietlow et al.

(10) Patent No.: US 10,086,377 B2
(45) Date of Patent: Oct. 2, 2018

(54) SYSTEM FOR PRODUCING GLUTEN-FREE OATS

(71) Applicant: General Mills, Inc., Minneapolis, MN (US)

(72) Inventors: Philip K Zietlow, Wayzata, MN (US); Daniel J Winderl, Plymouth, MN (US); Mark E Arlinghaus, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 15/957,555

(22) Filed: Apr. 19, 2018

(65) Prior Publication Data
US 2018/0236453 A1     Aug. 23, 2018

Related U.S. Application Data

(62) Division of application No. 14/600,772, filed on Jan. 20, 2015, now Pat. No. 9,968,937.

(51) Int. Cl.
| | | |
|---|---|---|
| *B02B 5/02* | (2006.01) | |
| *B02B 3/00* | (2006.01) | |
| *A23L 7/10* | (2016.01) | |
| *A23L 7/196* | (2016.01) | |
| *A23L 5/20* | (2016.01) | |

(52) U.S. Cl.
CPC ...... *B02B 5/02* (2013.01); *A23L 5/20* (2016.08); *A23L 7/10* (2016.08); *A23L 7/196* (2016.08); *B02B 3/00* (2013.01)

(58) Field of Classification Search
CPC ...... B02B 5/02; B02B 3/00; A23L 5/20; A23L 7/10; A23L 7/196
See application file for complete search history.

(56) References Cited

U.S. PATENT DOCUMENTS

| | | |
|---|---|---|
| 45,796 A | 1/1865 | Ogborn |
| 178,257 A | 6/1876 | Snavely et al. |
| 183,059 A | 10/1876 | Leach |
| 209,208 A | 10/1878 | Allonas |
| 677,789 A | 7/1901 | Nagel et al. |
| 788,839 A | 5/1905 | MacDonald |
| 896,891 A | 8/1908 | Campbell |
| 985,696 A | 2/1911 | Pearce |

(Continued)

FOREIGN PATENT DOCUMENTS

GB     855597     12/1960

*Primary Examiner* — Anthony J Weier
(74) *Attorney, Agent, or Firm* — Diederiks & Whitelaw, PLC; Gregory P. Kaihoi, Esq.

(57) ABSTRACT

A method and system for removing foreign grains from oat grains to establish gluten-free oats, i.e., oat grains having gluten levels below 20 ppm and, more preferably, below 10 ppm, relies upon performing various mechanical differentiation operations on a combination of grains, including oats and foreign, or gluten containing, grains. The mechanical differentiation operations can be arranged in series or in a combination of series and parallel operations. The various operations preferably include width grading and multiple length grading steps, as well as an aspirating steps, as well as a potential debearding step. The resulting oats can be used to make a wide range of gluten-free oat food products, including cereal and granola products.

13 Claims, 3 Drawing Sheets

(56) References Cited

U.S. PATENT DOCUMENTS

| | | | |
|---|---|---|---|
| 988,707 A | 4/1911 | Hedfeldt | |
| 1,179,875 A | 4/1916 | Venus | |
| 1,327,193 A | 1/1920 | Braddy | |
| 1,339,161 A | 5/1920 | Bryan | |
| 1,356,043 A | 10/1920 | Cowan | |
| 1,398,162 A | 11/1921 | Stansbury | |
| 1,974,309 A | 9/1934 | Jones | |
| 2,080,890 A * | 5/1937 | Ingraham | B07B 13/02 209/684 |
| 2,125,812 A | 8/1938 | Robertson | |
| RE21,136 E * | 7/1939 | Davis | B03B 4/02 209/467 |
| 2,332,506 A * | 10/1943 | Curtis | B07B 13/00 209/255 |
| 2,520,667 A * | 8/1950 | Welch | B07B 13/02 209/684 |
| 2,864,702 A | 12/1958 | Murray et al. | |
| 3,833,118 A | 9/1974 | Gilmore et al. | |
| 3,901,725 A | 8/1975 | Bond et al. | |
| 4,208,274 A | 6/1980 | Satake et al. | |
| 4,384,953 A | 5/1983 | Christian | |
| 4,466,542 A | 8/1984 | Oetiker et al. | |
| 4,840,727 A | 6/1989 | Humphrey | |
| 5,019,242 A | 5/1991 | Donelson | |
| 5,301,811 A | 4/1994 | Mueller | |
| 5,597,076 A | 1/1997 | Kershner | |
| 5,860,531 A | 1/1999 | Satoru et al. | |
| 6,113,908 A | 9/2000 | Paton et al. | |
| 6,253,928 B1 | 7/2001 | Weber | |
| 6,602,130 B1 | 8/2003 | Manning et al. | |
| 7,891,498 B2 | 2/2011 | Ernst | |
| 9,364,866 B2 * | 6/2016 | Davis | B07C 5/3425 |
| 9,463,493 B1 * | 10/2016 | Arlinghaus | B07C 5/3425 |
| 9,968,937 B2 * | 5/2018 | Zietlow | B02B 5/02 |
| 2005/0089602 A1 | 4/2005 | Kvist et al. | |
| 2009/0169683 A1 * | 7/2009 | Findlay | B02B 1/08 426/72 |
| 2009/0311376 A1 | 12/2009 | Rao et al. | |
| 2015/0314335 A1 * | 11/2015 | Davis | A23L 7/197 209/3.1 |

\* cited by examiner

SYSTEM FOR PRODUCING GLUTEN-FREE OATS

CROSS-REFERENCE TO RELATED APPLICATIONS

This application represents a divisional application of U.S. patent application Ser. No. 14/600,772, filed Jan. 20, 2015, pending. The entire content of this application is incorporated herein by reference in its entirety.

FIELD OF THE INVENTION

The invention generally pertains to the sorting of grains and, more particularly, a method and system for separating oat grains from foreign grains and other contaminants in order to produce gluten-free oats, i.e., oats having gluten levels below 20 ppm and, more preferably, less than 10 ppm.

BACKGROUND OF THE INVENTION

Sensitivity to gluten is estimated at afflicting up to 2% of the population. In fact, based on the increased awareness of Celiac disease and gluten intolerance, gluten levels in certain foods can be a limiting factor in consumption. Oats themselves do not contain gluten. However, oats cultivated in North America, Europe and even other parts of the world are commonly contaminated by gluten containing foreign grains, including wheat, barley, rye and triticale. This contamination is commonly known to come from various sources, mainly from the rotation of small grain crops on the same land, with residual contaminating seeds germinating with a seeded oat crop. In addition, contamination from other grains which are harvested, transported, stored and merchandized in common with oats is a contributing factor. As a result, it is not uncommon to find from 0.5% to 5.0% of these other grains mixed with commercially marketed oats. Therefore, absent dedicating land, harvesting equipment, transporting vehicles, storage units, packaging and production facilities, and the like only for use in connection with oats, cross contamination is inevitable.

Relatively recently, the U.S. federal government finalized rules for labeling products "gluten-free", with the American regulations being similar to the Codex rules established in Europe, which stipulate a maximum of 20 ppm gluten in "gluten-free" food products. Based on guidelines from the United States Food and Drug Administration, oats will continue to be eligible for gluten-free labeling as long as they are substantially free of foreign seeds. With this in mind, separating oats from foreign grains and other contaminants is required if oat products are to be produced to mandated gluten levels.

Known grain sorting techniques typically rely on mechanical or optical systems. Mechanical systems are considered advantageous generally based on their simplicity and cost benefits. However, simply put, previous attempts to employ mechanical sorting machines have failed to consistently deliver oats without undesirably high levels of gluten contaminants. Optical systems generally employ multiple cameras to view grain falling toward a grain rejection mechanism. In some machines, duplicate optical units are positioned on opposite sides of a sorter to provide simultaneous images of opposing sides of the grains. In general, optical sorters have higher associated costs and known optical sorters also have not been sufficiently effective in achieving the reduced gluten levels desired in accordance with the invention. Therefore, there is seen to exist a need to provide a method and apparatus for effectively and efficiently decontaminating oat grains in order to produce gluten-free oats useable for various purposes, particularly as an oat ingredient in the production of various food products, including cereal and granola.

SUMMARY OF THE INVENTION

The present invention is directed to a method and system for removing foreign grains from oat grains to establish gluten-free oats, i.e., oat grains having gluten levels below 20 ppm and, more preferably, below 10 ppm. The present invention relies upon performing a series of mechanical differentiation operations on a combination of grains, including gluten-free oats and foreign, or gluten containing, grains. More specifically, following at least initial cleaning operations which preferably include a size screening step, numerous successive sizing operations employing mechanical width and length graders are performed. In particular, the grains are processed through multiple width and multiple length grading operations in establishing a processed combination of grains.

In accordance with one embodiment of the invention, the processed combination of grains is then density separated to establish gluten-free oats. Performing the series of grading operations in combination with the late stage density separation has been found to reduce the percentages of contaminating grains to less than the 20 ppm level. In accordance with an aspect of the invention, a subsequent aspiration step can also be performed following the late density separation phase.

In accordance with other embodiments of the invention, the combination of grains are also processed through a scour/debeard stage, such as prior to an aspiration step. In addition, the series of grading operations include multiple width grading steps which divide the combination of grains into different sized grain blends, with the different sized grain blends being processed through other, distinct series of grading operations in parallel paths. Within one or more of the parallel paths, recycle processing can be performed in order to subject separated grains to further processing in order to increase the overall yield.

The resulting oats can be used to make a wide range of gluten-free oat food products, including cereal and granola products. In accordance with the invention, the very low level of gluten is advantageously achieved without the need to de-hull the oats. In any case, additional objects, features and advantages of the invention will become more readily apparent from the following detailed description of preferred embodiments thereof when taken in conjunction with the provided drawings.

DETAILED DESCRIPTION OF INVENTION

As indicated above, the invention is directed to a method and system for separating oat grains from foreign grains and other contaminants in order to produce gluten-free oats. By "gluten-free", it is meant that the oats have gluten levels below 20 ppm and, more preferably, less than 10 ppm. In general, the method and system of the invention is practiced by utilizing mechanical separation techniques, thereby being effective at a low cost, to reduce starting gluten levels of about 1000-1200 ppm to achieve gluten-free oats for consumer food production. In general, following initial cleaning operations, a series of mechanical differentiation operations are performed on a combination of grains, particularly a series of multiple width and multiple length grading steps, followed by a late stage density separation step. Overall, the invention has been found effective in separating oat grains from the contaminant grains, resulting in oats below 10 ppm gluten in the resulting supply, thereby achieving the gluten-free goal as detailed further below.

Figure 1:
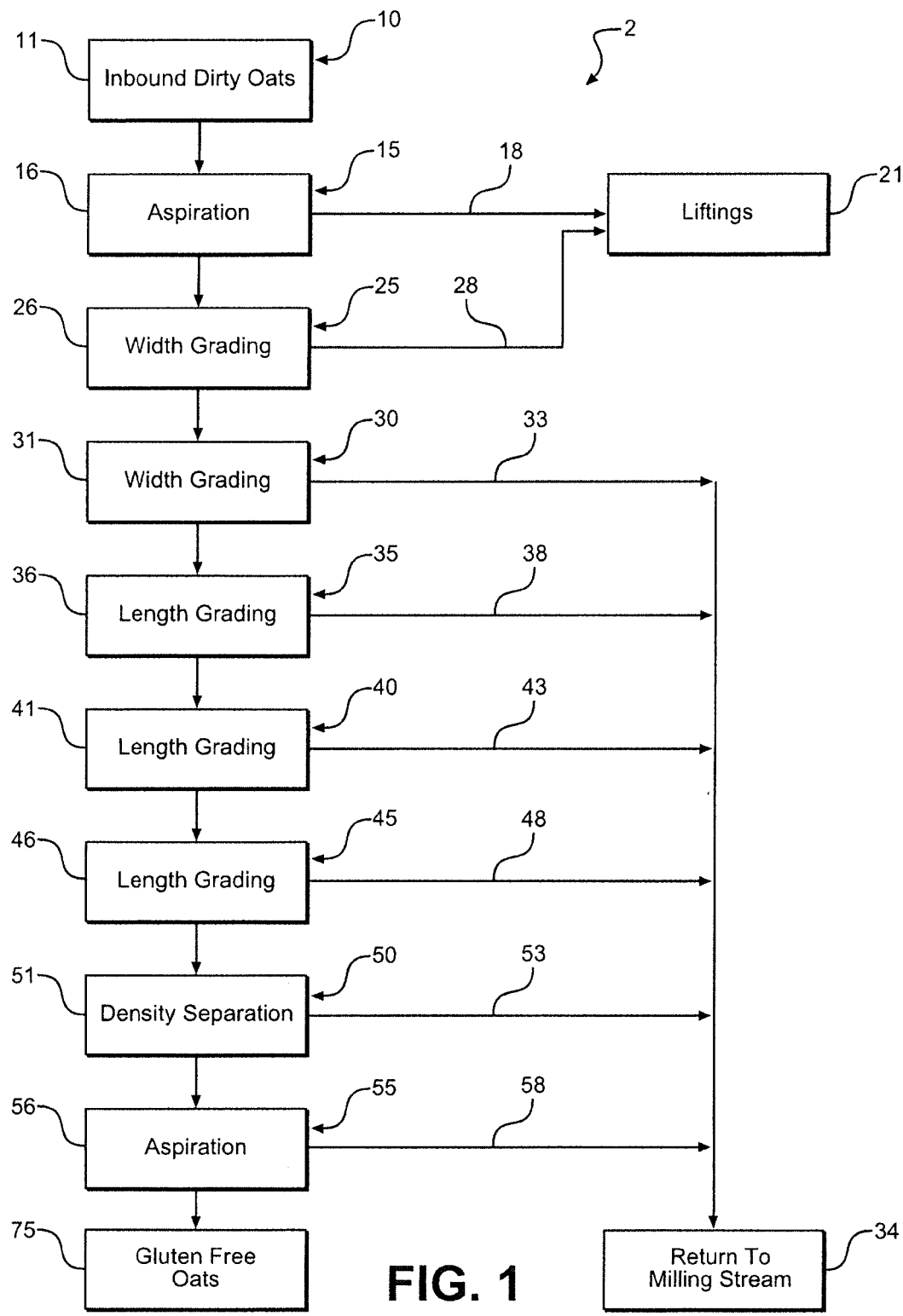
FIG. 1 is a flow chart representing a series of operations performed in connection with a first embodiment of the method and system of the invention.

With initial reference to FIG. 1, the system and method according to a first embodiment of the invention is generally indicated at 2. The starting point is indicated at step 10 wherein a supply of inbound dirty oats 11 is received. For purposes of setting forth an exemplary embodiment of the overall method of the invention, an input supply flow of 2000 bu/hr will be used as a reference. In any case, inbound dirty oats 11 include a combination of grains, including oat grains and various foreign grains, as well as potentially other contaminants. As the oat grains themselves are gluten-free, it is desired to separate the oat grains from the gluten containing foreign grains. As shown, the inbound dirty oats 11 are processed through an initial aspiration step at 15. Initial aspiration step 15 is preferably performed using a channel aspirator 16 designed to remove any chaff, dust, empty oats and low-density foreign grains which can be conveyed along line 18 from the overall combination of grains. Collectively, the chaff, dust, empty oats and/or low-density foreign grains constitute liftings 21 which are removed from the overall stream. Overall, aspiration step 15 removes about 1% of the contaminants, particularly non-grain contaminants.

Following aspiration step 15, the combination of grains proceed to various width grading and then length grading steps, shown to include a first width grading step 25 employing a width grader 26. Removed grains from this width grading operation are conveyed along line 28 to be combined with liftings 21. Although various known grading and separation equipment can be employed, the invention preferably employs a slotted tri-bar screen in a cylinder as width grader 26. In one particular embodiment, it is desired to provide a grading rate of approximately 2050 bu/hr utilizing a $9/64"\times3/4"$ slotted tri-bar screen-type width grader 26. For the sake of completeness, it has been found that having width grader 26 exhibit a width grade in the order of $8/64$-$10/64$ inches has proven effective to remove an additional 1% of the contaminants, some foreign grains but particularly non-grain contaminants.

Width grading step 25 is followed by a second width grading step 30 which employs a width grader 31. Contaminants removed by width grader 31 are conveyed along line 33 to a milling return stream 34. The grains in milling return stream 34 can be employed in connection with making other food products which are not slated to be gluten-free or further processed in ways outside the scope of the present invention to establish an additional supply of low level gluten oats. In general, width grader 31 sorts based on size of the oat and, in a preferred embodiment, allows about two-thirds of the present grain supply to pass, i.e., about 35% of the grain stream is removed along line 33. In a particular embodiment, a $6/64$ inch slotted screen width grader 31 is employed, operating at a rate of about 1280 bu/hr.

Subsequent to width grading steps 25 and 30, the remaining combination of grains proceeds through a series of mechanical length grading operations. That is, the combination of grains is subject to a first length grading step at 35 employing a length grader 36 which removes additional gluten-containing contaminants along line 38, a second length grading step at 40 employing a length grader 41 which removes even more gluten-containing contaminants along line 43, and a third length grading step 45 employing a length grader 46 which removes further gluten-containing contaminants along line 48, with each of lines 38, 43 and 48 leading to milling return stream 34. In connection with these crucial steps, the processing must be controlled based on the selected machinery in order to provide effective separation. In accordance with a preferred embodiment, indent length grading cylinders are employed, with the indent length graders being composed of metal cylinders with indent pockets pushed out from the center. The size of the indent pockets determines the length of the grain which will fall into the pocket and be lifted out of remaining, larger grains as the cylinder rotates. This lifted material falls into a trough in the center of the cylinder and is conveyed out of the machine with a screw conveyor. The larger grains slide and tumble to the bottom of the rotating cylinder and make their way to a discharge region of the cylinder. A typical indent cylinder cleaning operation removes 90% to 95% of foreign grains. However, to achieve the gluten free requirements for the invention, the present process removes between 98% to 99.5% of the foreign grains.

By way of example, a commercial $20/64$ inch indent length grader having a 23 inch diameter by 85 inch long cylinder presents 29700 indents per revolution. At 55 rev/min, the total indents are 1633500 per minute. Therefore, the ratio of indents to grain passing through at various rates are as follows:

15 lb/min×11000 grains/lb=165000 grains/min; indents/grain ratio=9.9

20 lb/min×11000 grains/lb=220000 grains/min; indents/grain ratio=7.4

25 lb/min×11000 grains/lb=275000 grains/min; indents/grain ratio=5.9

30 lb/min×11000 grains/lb=330000 grains/min; indents/grain ratio=5.0

40 lb/min×11000 grains/lb=440000 grains/min; indents/grain ratio=3.7

50 lb/min×11000 grains/lb=550000 grains/min; indents/grain ratio=3.0

Typical operation of indent length graders in the grain cleaning industry for 23 inch diameter by 85 inch long cylinders is a feed rate of 40-50 lb/min and rotation speeds of 46-50 rpm, leading to an indents/grain ratio of 2.7 to 3.4.

For the present invention, the indent cylinders employed are provided in a variety of diameters and lengths, as well as in different indent sizes. The keys to optimizing the removal of gluten containing grains is the size of the indents, the number of indents each grain is exposed to (indents/grain ratio) and the number of passes through various sized cylinders. With the above in mind, length grader 36 is, in accordance with one embodiment, operated in a preferred range of 10-20 lbs/min, with over 20% of the grain stream being directed into line 38. That is, a preferred form employs a 20/64 indent cylinder for length grader 36 having a feed rate of 23 lb/min with an indents/grain ratio of 6.5, thereby providing a lifted reject stream of 6.0 lb/min or 26%. Basically, length grader 36 results in the loss of short grains, particularly 95% of short wheat, barley and rye grains, as well as groats and short or stub oats. In this exemplary embodiment, length grader 41 also constitutes a 20/64 inch diameter grader including an indent cylinder having a feed rate of 17 lb/min and an indents/grain ratio of 8.7 to establish a lifted reject stream of 1.7 lb/min or 10%. Finally, length grader 46 operates at even a slower lift reject stream. That is, length grader 46 is preferably constituted by a 22 or 23/64 inch diameter length grader which is operated even slower, specifically at a feed rate of 15.3 lb/min with an indents/grain ratio of 9.7, thereby establishing a lifted reject stream of 0.25 lb/min. Here, mostly barley is targeted as a remaining contaminant grain, mainly remaining because the barley has a husk like the oats. In any case, this added step actually only removes about 1.6%. Overall, it has been shown that the invention is effectively carried out if the length grading operations are performed to achieve at least a 23% removal amount and preferably over 31%.

In connection with obtaining a very low gluten level and achieving gluten-free oats in accordance with the invention, the overall processing also employs a density separation step at 50 utilizing a density separator 51. In the art of grain separation, a density separator would normally be employed as an initial step, typically to remove stones, glass, metal and other heavy contaminants from an incoming grain stream. Although such an initial density separating operation could be included in connection with the overall process shown in FIG. 1, it has been found that providing density separator 51 downstream of the various grading stages can be employed to effectively remove numerous other gluten containing contaminants. More specifically, it has been found that certain remaining oat groats at this stage are associated with hairs (trichomes) that tend to retain gluten containing dust. With this in mind, density separator 51 is preferably run slow (e.g., about 780 bu/hr) to allow for these groats to migrate up in the separator for removal. Although only about 0.4% removal is achieved along line 53, this amount certainly contributes in further minimizing the final gluten level.

Finally, as clearly shown in this figure, an addition aspiration step 55, utilizing an aspirator 75, is performed. Here, a high aspiration is preferably performed to blow off dust and other contaminants, including some wheat and barley. A rate of about 770 bu/hr has been performed, achieving an additional 0.5% removal along line 58 in resulting in the gluten-free oats of the invention as indicated at 75. As set forth above, it has been found that contaminated oat grains can be processed in accordance with the invention to establish gluten-free oats 75 which actually have a gluten level of less than 10 ppm. Although current standards stipulate a maximum of 20 ppm gluten for a "gluten-free" food product, the present invention significantly improves upon this maximum level. In any case, the separated gluten-free oats 75, and even the contaminated grains conveyed through lines 33, 38, 43, 53 and 58 to milling return stream 34, can be further processed to produce a wide range of food products. In any case, important in connection with the present invention, oats 75 can be used to produce various gluten-free food products, including cereals and granola-based products.

Figure 2:
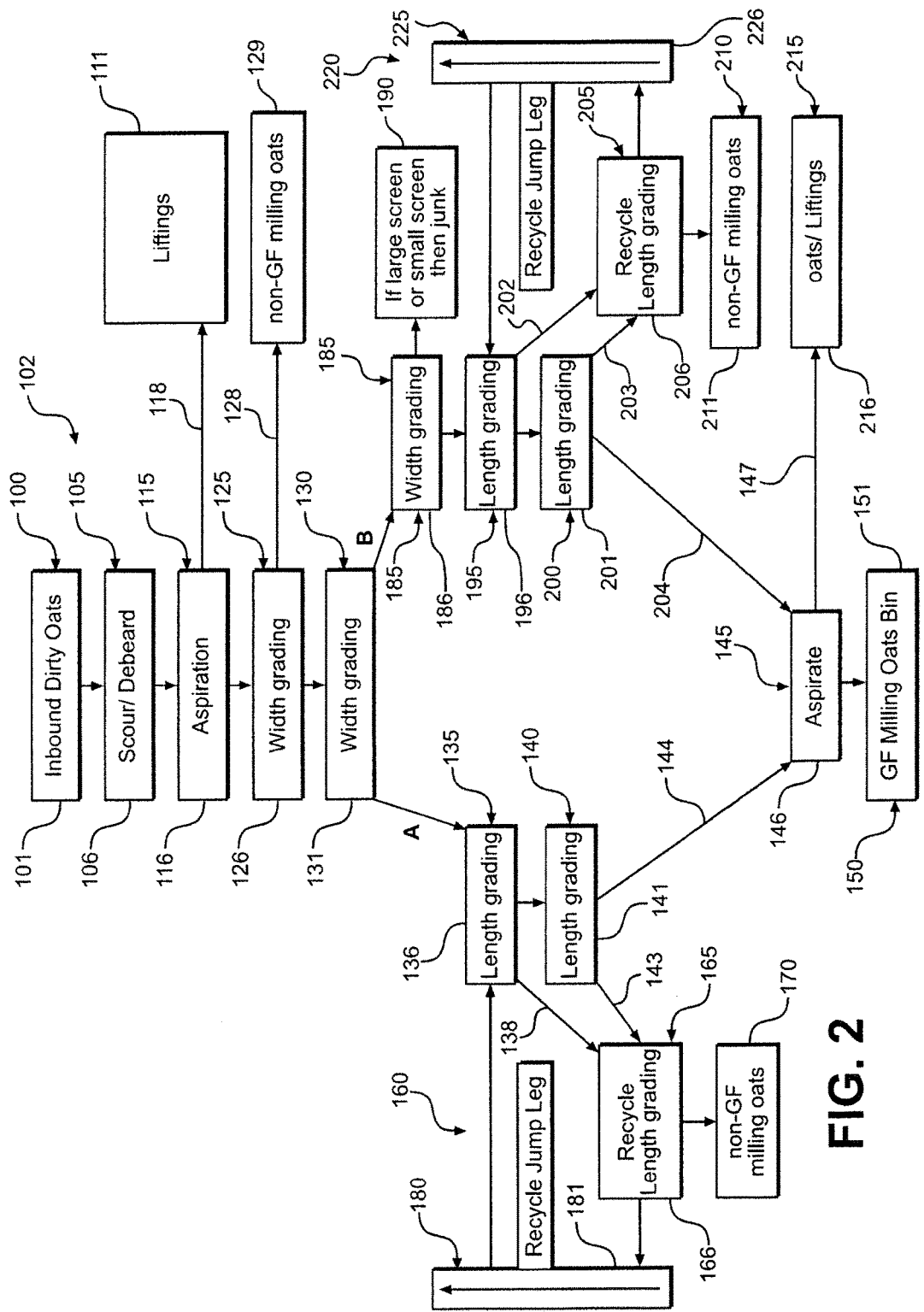
FIG. 2 is a flow chart representing a series of operations performed in connection with a second embodiment of the method and system of the invention.

With reference to FIG. 2, a system and method according to a second embodiment of the invention is generally indicated at 102 and will now be described in detail. For this embodiment, the starting point is indicated at step 100 wherein a supply of inbound dirty oats 101 is received. As with the embodiment described above, inbound dirty oats 101 include a combination of grains, including oat grains and various foreign grains, particularly barley, rye and wheat grains, as well as potentially other contaminants. Again, the oat grains themselves are gluten-free so it is desired to separate the oat grains from the foreign grains and other contaminants. In particular, it has been found that separating the oats from the barley is more problematic than the other foreign grains and contaminants. With this in mind, the inbound dirty oats 101 are processed through an initial scour and/or debearding step at 105. Step 105 is considered to aid in at least particular ways. First, the oat grains tend to be clipped without much abrasion to avoid removing the hulls. Second, the barley is debearded, thereby removing longer whiskers and reshaping the barley. Next, liftings 111 are collected by subjecting the combination of grains to an aspiration step at 115. As with the embodiment described above, this initial aspiration step 115 is preferably performed using a channel aspirator 116 designed to remove any chaff, dust, empty oats and low-density foreign grains which can be conveyed along line 118 from the overall combination of grains to establish liftings 111.

Following aspiration step 115, the combination of grains proceed to a first series of grading operations. More specifically, the combination of grains are directed to a first width grading step 125 employing a width grader 126, with removed grains from this width grading operation being conveyed along line 128 to establish non-gluten free oats 129 which can be milled for other purposes. Although various known grading and separation equipment can be employed, the invention preferably employs a slotted tri-bar screen in a cylinder as width grader 126. In one particular embodiment, it is desired to utilize a 8.5/64×3/4 inch slotted tri-bar screen-type width grader 126. Overall, width grading step 125 tends to remove essentially all oversized grains, such as soybeans and some corn, stones and other contaminants (including unthreshed wheat, unthreshed barley and a small percentage of threshed barley) such that, following width grading step 125, mainly only oats, barley, wheat and rye proceed for further processing.

Width grading step 125 is followed by a second width grading step 130 which employs a width grader 131, such as a 5.75/64 width grader. At this point, it should be noted that the configuration of width grader 131 can be varied to manipulate the outputs based on any given combination of grains obtained during a particular crop year or the origin of the crop. The main function of width grader 131 is to bifurcate or otherwise divide the stream of grains to multiple paths, shown here as streams A and B which can then be advantageously further processed in parallel. In general, stream A constitutes a first blend of grains which are larger than a second blend of grains in stream B. Therefore, the grains in stream A tend to be thicker, more plump and also generally longer, while the grains in stream B tend to be thinner. In general, barley is not typically thin and therefore little barley will be found in stream B. Overall, the percentage of grains in each path can vary, with a 50/50 split being generally ideal but a split in the range of 40/60-60/40 being commonly observed.

In connection with stream A, this combination of grains is further processed through a series of mechanical grading operations to establish a first supply of processed grains. More specifically, subsequent to width grading step 130, the combination of grains in stream A proceeds through a series of mechanical length grading operations. That is, the combination of grains is subject to a first length grading step at 135 employing a length grader 136 which removes additional gluten-containing contaminants along line 138, and then a second length grading step at 140 employing a length grader 141 which removes even more gluten-containing contaminants along line 143. Overall, this arrangement establishes a progressive lifting process to further contamination removal. On the other hand, a first supply of processed grains in the form of gluten-free oats is output along line 144. As with the first embodiment described above, analogous indent length grading cylinders are employed in steps 135 and 140. By way of example, a commercial $^{16}/_{64}$ inch indent length grader is employed for length grader 136, while length grader 141 constitutes a combination grader which is provides for both $^{20}/_{64}$ inch and $^{23}/_{64}$ inch sizing utilizing a common cylinder in order to improve the overall yield. As shown, the first supply of processed grains at line 144 are directed to an aspiration step at 145 wherein an aspirator 146, located downstream of the first series of mechanical graders 136, 141, operates to lift final light particles or dust from the grains and direct the same along line 147. On the other hand, the final gluten-free oats are collected at step 150 in a bin 151.

Also illustrated in FIG. 2 as a potential add-on to system 102 is a recycle unit 160. Here, liftings from both length grader 136 at line 138 (mostly rye, wheat and barley) and length grader 141 at line 143 (typically no wheat, rarely rye and little barley) are directed at step 165 to a recycle length grader 166, such as a $^{20}/_{64}$ inch length grader. Liftings from length grader 166 establish non-gluten free milling oats 170, while the remainder is introduced at step 180 to a recycle jump leg 181 leading back to length grader 136. Basically, it has been found that this overall recycle loop tends to pick-up in the order of 3-5% more gluten-free oats.

In connection with stream B, this portion of the initially processed combination of grains is directed through a third series of mechanical graders, which is distinct from the second series of mechanical graders, to establish a second supply of processed grains. More specifically, stream B is first directed to a width grading step 185 which employs a width grader 186, such as a $^{4}/_{64}$ inch width grader. The grains which do not make it through width grader 186 establish non-gluten free milling oats at 190. Basically, if a rather large screen is used, the non-gluten free milling oats can be used in making non-gluten-free products. If a small screen is employed, the non-gluten milling oats at 190 will typically not be used for human consumption. On the other hand, the processed grains proceed to length grading step 195 employing a length grader 196 and a subsequent length grading step 200 employing a length grader 201. In one form of the invention, length grader 196 is constituted by a $^{14}/_{64}$ inch length grader, while length grader 201 constitutes a $^{16}/_{64}$ length grader. The liftings from length grader 196 and the liftings from length grader 201 are directed along lines 202 and 203 respectively, while a second supply of processed grains are directed along line 204 and combined with the first supply of processed grains from line 144 for at least one final separation step (shown as aspiration step 145) to establish the gluten-free supply of oats used to produce a wide range of gluten-free food products, including cereals and granola-based products, in accordance with the invention.

Like recycle unit 160, another recycle loop can be employed in this parallel path by the inclusion of a recycle unit 220. More specifically, liftings along lines 202 and 203 are subjected to a recycle length grading at step 205 utilizing a length grader 206, such as a $^{16}/_{64}$ inch length grader. Through step 210, the liftings from length grader 206 are collected at step 210 as non-gluten free milling oats at 211. Although not shown, these collections can be separately utilized as a non-gluten free milling oats source, or screened and combined with those from line 147 at step 215 having aspirated oats/liftings indicated at 216. On the other hand, the tailings obtained at recycle length grader 206 are directed, at step 225, to a recycle jump leg 226 and delivered back to length grader 196 for further processing in order to increase the overall yield.

Figure 3:
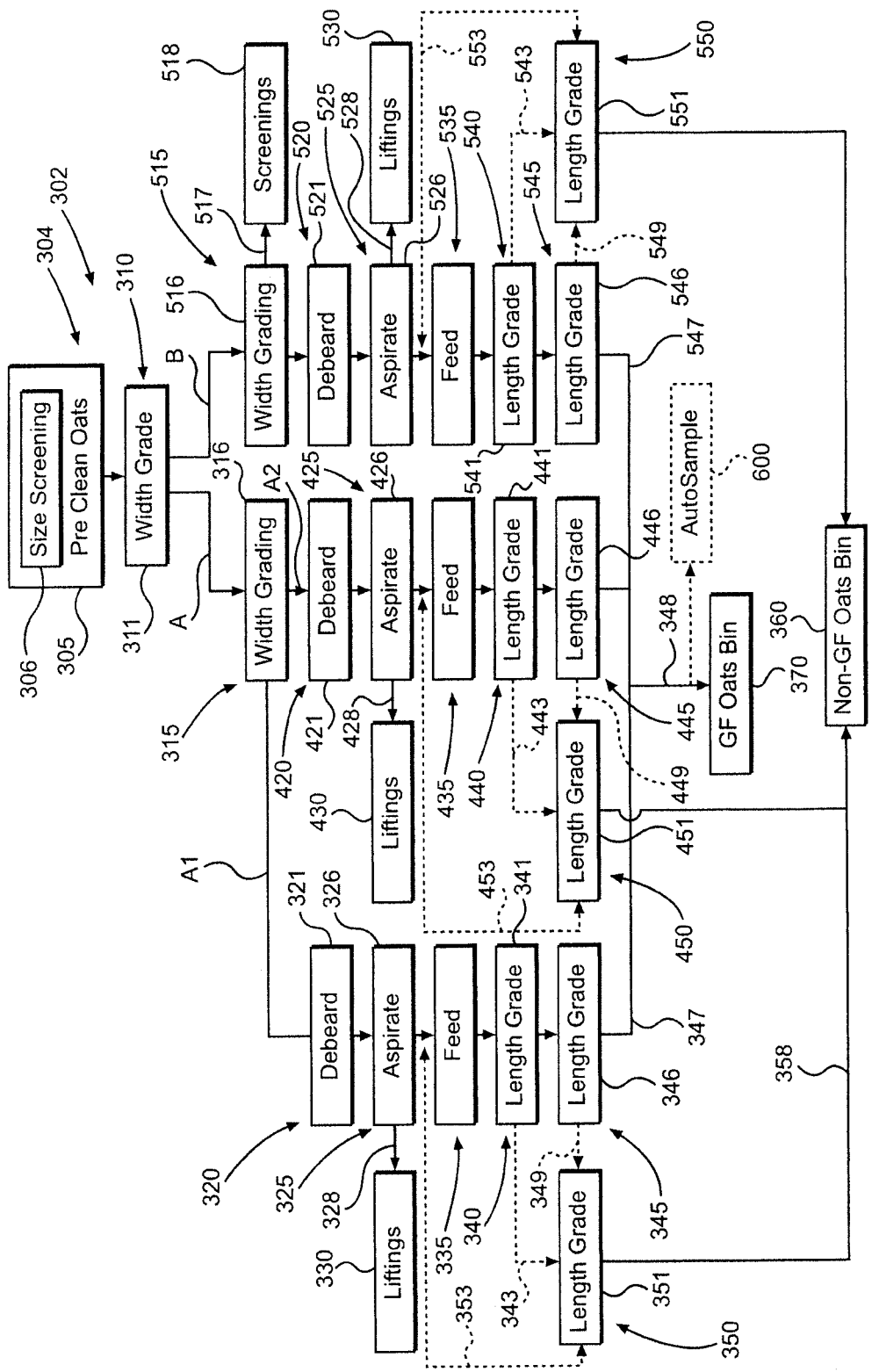
FIG. 3 is a flow chart representing a series of operations performed in connection with a third embodiment of the method and system of the invention.

In the embodiment of FIG. 2, the debearding and aspirating steps are performed prior to establishing the parallel series of mechanical grading operations. FIG. 3 sets forth another embodiment of a system and method 302 according to the invention in order to illustrate certain additional variations. More specifically, system and method 302 starts at step 304 wherein inbound dirty oats are cleaned to establish pre-cleaned oats 305. As before, this supply of oats 305 actually includes a combination of grains, such as oat grains combined with various foreign grains and potentially other contaminants. In accordance with a particular aspect of the invention, a size screening with a size screener 306 is performed in connection with pre-cleaning step 304. In fact, it has been found that having the combination of grains pass through a slotted screen which is less than $9^{1}\!/_{2}/64$ inch, preferably less than $^{9}/_{64}$ inch, and most preferably 8.5/64 inch, advantageously and effectively removes certain contaminants, particularly unthreshed wheat, at this early operational stage. This is important as it can prove more problematic to remove unthreshed wheat in latter stages. Instead of proceeding through a scour, debearding and/or aspirating step(s) prior to width grading as with the other embodiments described above, the supply of oats 305 goes through an initial width grading step 310 employing a width grader 311 to establish separate blends of grains indicated as flows A and B. In one form of the invention, flow A from width grader 311 includes the plump and mid-sized grains, while flow B constitutes the thinner grains. Starting with flow A, another width grading step 315 is performed with width grader 316 so as to establish separate flows A1 and A2. Overall, flow A1 receives about 50% of the original flow at step 304 and includes the largest or plump grains. On the other hand, each of flows A2 and B exhibits about 25%, with flow A2 including the mid-sized grains and flow B being constituted by thin sized grains. From this point, flows A1, A2 and B are subjected to separate series of mechanical operations in connection with producing gluten-free oats as will be fully detailed below. However, at this point, it should be recognized that initially separating the input supply based on width is considered to enhance the ability to produce gluten-free oats as the separate mechanical operations can be tailored to the individual flows, specifically as the separating the gluten-free oats from the supply of thinner grains has proven to be more problematic.

As shown in this figure, flow A1 proceeds from width grader 316 through a debearding step 320. In a manner analogous to the other embodiments, the oat grains in flow A1 are basically clipped by a debearder 321 without much abrasion so as to avoid removing the hulls, while any existing barley in flow A1 is debearded to remove longer whiskers and to reshape the barley. Thereafter, the method proceeds to aspiration step 325 wherein an aspirator 326 is employed such that clipped and debearded liftings are directed along line 328 and collected at 330. Along with the clipped and debearded liftings, aspiration step 325 functions to remove any chaff, dust, empty oats and low-density foreign grains which are conveyed along line 328 so as to be separated from the remainder of flow A1 which is then fed at step 335 to a series of length grading steps. More specifically, from feed step 335, the flow first proceeds to a length grading step 340 wherein an initial length grader 341 performs partial length separation and directs longer grades along line 343 while the remainder (tailings) of the flow proceeds to length grading step 345 wherein a length grader 346 separates the remaining grains which are directed along one of lines 347 and 349. At this point, the plump oats directed into line 347 are gluten-free and therefore are further directed to line 348. On the other hand, flows from lines 343 and 349 are directed to a third length grading step 350 wherein a length grader 351 directs larger tailings of grains along line 353 back to feed step 335 and the oat liftings are directed to line 358 wherein they are directed to non-gluten-free oats bin 360. On the other hand, line 348 leads to a gluten-free oats bin 370.

As for flow A2, this mid-size flow similarly proceeds to a debearding step indicated at 420, employing a debearder 421, followed by an aspiration step 425 utilizing an aspirator 426. Again, in a manner directly analogous to flow A1, a portion of the flow A2, upon being aspirated, is directed into line 428 and collected as lifting 430, while the remainder proceeds to a feeding step 435 leading to an initial length grading step 440. Here, a length grader 441 removes additional gluten-containing contaminants along line 443, while directing the remainder to length grading step 445. In length grading step 445, length grader 446 directs further liftings along line 449 which combine with the liftings from line 443 so as to undergo a further length grading step at 450 utilizing a length grader at 451. The grains (tailings) which do not proceed to line 449 are directed from length grader 446 to gluten-free oats bin 370 through line 348. Length grader 451 removes additional grains which flow along line 453 back to feed step 435 for further processing, while also producing non-gluten-free oats which are directed through line 358 to non-gluten-free oats bin 360.

As mentioned above, the embodiment of FIG. 3 takes particular advantage of the recognized fact that oats can be more easily separated from larger width grains than more narrow or thinner grains. With this in mind, the processes for flow B are designed to handle the more narrow-width grains which, inherently, are more cumbersome to separate in producing gluten-free oats. By establishing the multiple, parallel processing paths, the processing of these different flows can be particularly tailored to enhance the percentage output of gluten-free oats. With this in mind, flow B proceeds to width grading step 515 wherein a width grader 516 initially directs a flow through line 517 to establish screenings 518. The remainder of flow B proceeds to debearding step 520 including a debearder 521, and an aspiration step 525 employing an aspirator 526. Aspiration step 525 has a first output through line 528 establishing further liftings 530. The remainder is directed to a feed step 535 and a first length grading step 540. At length grading step 540, a length grader 541 directs a first flow of grains through line 543 and a second flow to a length grading step 545 including a length grader 546. Length grader 546 has a first output at 547 which merges with line 348 to connect with gluten-free oats bin 370. Length grader 546 also has a second output 549 leading to a length grading step 550 wherein grains received through lines 543 and 549 are further length graded to produce a flow of non-gluten-free oats delivered to oats bin 360, while the remainder of the grain flow is recycled through line 553 back to feed step 535 for reprocessing.

Certainly, it should be apparent that the invention establishes gluten-free oats without the need for any expensive or complicated optical equipment previously relied upon. Instead, the present invention is seen to advantageously rely on mechanical grain sorting techniques, particularly the use of various series of mechanical grading operations performed either in series or parallel. This particular arrangement has been found to have certain costs and effectiveness advantages. In addition, the invention does not require de-hulling of the oats prior to processing through the system. Still, the first embodiment of the invention described above has its limitations, particularly in that, of the original percentage of oats in the incoming, combined oats/foreign grain supply, only about 35% of this stream exists in the resulting gluten-free oat supply. Therefore, about 65% of the oats will remain in a contaminated form or would require other processing if low gluten levels were also desired for the remaining oats. However, in connection with the second embodiment of the invention described with reference to FIG. 2, this percentage yield is increased to about 70%. The FIG. 3 embodiment is seen to have even further advantages, particularly in connection with producing gluten-free oats in bin 370 which are well below the desired 10 ppm gluten level for the oat grains. By way of example, for testing purposes, the functioning of the embodiment of FIG. 3 can be performed in association with testing grains flowing through line 348 through an auto sampler generally indicated at 600. In any case, this embodiment also exhibits an increased percentage yield of at least 75%, with the A1 flow actually exhibiting about an 85% yield, the A2 flow operations resulting in about a 75% yield and flow B resulting in about a 50% yield, with the remainder of the liftings and gradings being useable for other gluten containing products.

Although described with respect to preferred embodiments of the invention, it should be readily understood that various changes and/or modifications can be made to the invention without departing from the spirit thereof. In particular, it should be recognized that the disclosed embodiments set forth a series of differentiation operations based on preferred, exemplary configurations, such that the actual number and type of differentiation operations can vary in accordance with the overall invention, particularly depending on the amount of initial contamination, while keeping the overall unique processing characteristics. In addition, a wide range of processing equipment can be utilized in accordance with the invention to perform the series of differentiation operations as set forth above. Of course, the specific types of length and width graders are merely disclosed for the sake of completeness and other types of cleaning and sizing equipment could be employed without departing from the spirit of the invention. Overall, significantly enhanced results are recognized through parallel processing. With this in mind, further parallel paths could be employed. In addition, other mechanical processing could be performed, such as an additional debearding step after length grading, to further enhance separation, particularly in connection with the shorter grains. In any case, the invention is only intended to be limited by the scope of the following claims.

The invention claimed is:
1. A system for producing gluten-free oats comprising:
a first series of mechanical graders, including at least a first width grader, configured to process a combination of grains, including oat grains and foreign grains containing gluten, to establish an initially processed combination of grains;
a second series of mechanical graders, including at least one length grading operation, configured to process a portion of the initially processed combination of grains to establish a first supply of processed grains; and a third series of mechanical graders, including at least one length grading operation, configured to process another portion of the initially processed combination of grains to establish a second supply of processed grains, wherein the third series of mechanical graders are distinct from and arranged in parallel to the second series of mechanical graders, wherein the system is configured such that at least one of the first and second supplies of processed grains will constitute a supply of gluten-free oats.

2. The system of claim 1, further comprising: a fourth series of mechanical graders configured to process a still further portion of the initially processed combination of grains to establish a third supply of processed grains, wherein the fourth series of mechanical graders are arranged in parallel to each of the first and second series of mechanical graders.

3. The system according to claim 1, further comprising: a debearder located upstream of each of the second and third series of mechanical graders.

4. The system according to claim 3, further comprising: an aspirator located upstream of each of the second and third series of mechanical graders.

5. The system according to claim 2, wherein each of the second and third series of mechanical graders includes both width and length graders.

6. The system according to claim 5, wherein each of the second and third series of mechanical graders includes multiple length graders.

7. The system according to claim 6, wherein each of the second and third series of mechanical graders includes a recycle loop for recycling initially separated grains for repeated grain separation back through the multiple length graders.

8. The system according to claim 1, further comprising: a size screener for removing unthreshed wheat from the combination of grains prior to the first width grader.

9. The system according to claim 8, wherein the size screener has a less than a 9.5/64 inch screen size.

10. The system according to claim 9, wherein the screen size is 8.5/64 inch.

11. The system according to claim 4, wherein the aspirator is located downstream of the debearder.

12. The system according to claim 1, further comprising a recycle loop configured to receive at least some of the combination of grains from at least one of the second and third series of mechanical graders and recycle the at least some of the combination of grains back through at least one of the second and third series of mechanical graders.

13. The system according to claim 1, further comprising: means for combining the first and second supplies of processed grains downstream of the third series of mechanical graders.

* * * * *